Figure 1:
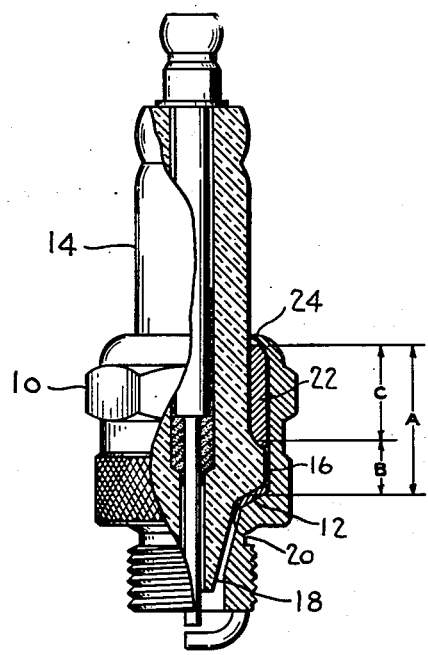

March 24, 1953     G. D. SUTER     2,632,431
SEAL BETWEEN METAL AND CERAMIC PARTS
Filed Aug. 10, 1949

*INVENTOR.*
GEORGE D. SUTER
BY John W. Michael
*ATTORNEY.*

Patented Mar. 24, 1953

2,632,431

UNITED STATES PATENT OFFICE 2,632,431

SEAL BETWEEN METAL AND CERAMIC PARTS

George D. Suter, Milwaukee, Wis., assignor to Globe-Union Inc., Milwaukee, Wis., a corporation of Delaware Application August 10, 1949, Serial No. 109,474

1 Claim. (Cl. 123—169)

This invention relates to improvements in seals, particularly the seals between the metal shell and ceramic insulating core of spark plugs used for igniting the charge in an internal combustion engine.

Because of dimensional variations created by changes of temperature over a wide range, it has always been a problem to maintain a gas-tight seal between the metal shell and ceramic insulating core. Heretofore copper gaskets, or a combination of copper gasket and ceramic seal assembled under pressure, have been utilized. While such seals have been useful particularly under constant operating temperatures, they are not entirely satisfactory. Under variations in temperature and consequent differences of expansion between the insulating core and the steel shell, such seals loosen up, especially when the plug is hot. The gas leakage which then occurs results in the deterioration of the copper gaskets and possibly in loss of engine compression. Even though leakage might not occur, the loosening of the seal also changes the thermal conductivity between the insulating core and the metal shell. The spark plug will then not remain within its heat rating and will overheat and pre-ignite during use.

It is an object of this invention, therefore, to provide a seal between a metal shell and a ceramic insulating core which will be and remain gas tight under pressure and changes of operating temperature.

Another object of this invention is to provide a seal between a metal shell and a ceramic insulating core which will retain a more nearly constant thermal conductivity between the ceramic core and the metal shell during changes of temperature throughout the range to which subjected in use.

These objects are obtained by providing a metal shell with an internal shoulder, placing a ceramic insulating core having an external flange in said shell with said flange resting on said shoulder, inserting a metal sleeve over said core and against said external flange, and compressing said sleeve longitudinally against said external flange to deform said sleeve and increase its wall thickness enough to make a tight seal between the sleeve and the ceramic core and metal shell. This deformation results in a galling action between the ceramic core and sleeve making the seal permanent. The sleeve is preferably made of aluminum having a linear coefficient of thermal expansion greater than the coefficient for the metal shell. It is also desirable to proportion the length of the sleeve to the thickness of the external flange on the ceramic core so that the total expansion of both flange and sleeve will compensate (in some cases over-compensate) for the total expansion of the metal shell between said internal shoulder and the part thereof which grips the sleeve. As expansion and contraction take place due to changes in temperature, the initial pressure-tight seal so established will be maintained and the thermal conductivity from the ceramic core through the metal sleeve to the metal shell will remain stable and good.

Figure 2:
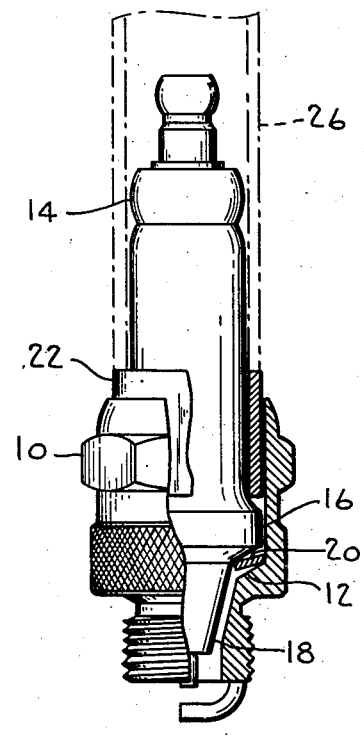

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Fig. 1 is a view partly in side elevation and partly in section showing a seal embodying the present invention incorporated in a spark plug for an internal combustion engine; and Fig. 2 is a view in side elevation and partly in section showing the manner in which the seal is applied to the spark plug of Fig. 1.

Referring to the drawing by reference numerals, the seal embodying the invention is shown incorporated in a spark plug comprising the usual metal shell 10 having an internal shoulder 12 and a ceramic insulating core 14 provided with an external flange 16. The electrodes and other well-known details of the spark plug are shown but not numbered and described. As is usual in the spark plug industry, the heat rating of the plug is determined by controlling the length of the insulating tip 18. Heat from the tip is conducted principally through the contact areas between: the flange 16 and the shoulder 12; the core 14 and sleeve 22; and the sleeve 22 and shell 10. If a gasket 20 is used then contact areas between the gasket 20 and the shoulder 12 and flange 16 also conduct heat from the tip 18. If the plug is to maintain its heat rating, the pressure fit between such contact areas must remain constant even though the plug be subjected to wide changes in temperature. Any change in the pressure will vary the thermal conductivity at such contact areas and the operation of the plug will be erratic. Also, any substantial lessening of the pressure fit at such areas will lessen the seal between the core and the shell and permit loss of engine-operating pressure through the plug.

To maintain this pressure fit under varying temperatures a metal sleeve 22 is loosely fitted over the core 14 and dropped within the bore of the shell 10 within which it loosely fits until it rests against the flange 16. The top of sleeve 22 projects above the top of the shell, as shown in Fig. 2. Downward pressure is applied to the top of the sleeve 22 by a tool indicated generally at 26. As pressure is applied the core 14 is forced downwardly against the shoulder 12. If a gasket 20 is used it will be compressed between the flange 16 and the shoulder 12 to form a seal at the areas of contact therebetween. At the same time the sleeve 22 will be compressed longitudinally so that it lies entirely below the top of the shell. This increases the thickness of the wall of the sleeve and makes a tight seal between such sleeve and the ceramic core and metal shell so galling the metal of the sleeve with respect to both the core and the shell that the tool 26 may be withdrawn and seal-tight fit remain. It is safer, however, to crimp over the upper edge of the metal shell 10, as indicated at 24, to make the seal more permanent.

In order to keep the sealing pressure thus initially established substantially constant throughout changes in temperature it has been found preferable to make the sleeve 22 of an aluminum commercially designated as "2 S." The physical and chemical properties of this aluminum are found in a hand-book entiled "Alcoa Aluminum and Its Alloys," published by Aluminum Company of America and copyrighted in 1947; particular reference should be had to the tables on pages 80, 85, 86, 88, and 92. The sleeve is soft annealed (that is a temper which is commerically designated "O") previous to assembly to substantially 10/18 Rockwell Hardness on a 15 T scale. In this condition it is soft and has more ductility than annealed copper and will deform laterally as it is compressed longitudinally and as a result will develop (it is believed) internal stresses within its limits of elasticity which will continue to exert the necessary sealing pressure throughout dimensional differentials brought about by temperature changes. In addition, the aluminum of the sleeve will not flow under the pressure and temperature conditions to which the plug is subjected during use.

It is advantageous to offset as much as possible any effects which dimensional changes due to temperature variation might have on the ability of the sleeve to maintain a pressure-tight seal and firm heat conducting contacting areas. It is therefore desirable to proportion the length of the sleeve 22 (when compressed) to the effective height of the flange 16 so that the combined expansion and contraction thereof due to temperature changes will equal (or in some cases exceed) the expansion of the metal shell between the shoulder 12 and the upper end thereof. In the case of aluminum, ceramic and steel, very desirable results may be obtained if the length of the sleeve is proportioned to the height of the flange in substantially the ratio indicated by the dimensions indicated by letters C and B on Fig. 1. This proportion, in which B is roughly one half of C, may be changed within limits depending upon differences in the coefficients of expansions of these materials and still have the combined expansion of the sleeve and flange equal or exceed the expansion in the steel shell for the dimension indicated by the letter A of Fig. 1.

Other metals than aluminum may be used in the sleeve 22 if such metals are sufficiently ductile to deform upon longitudinal compression and have thermal coefficients of expansion sufficiently greater than that of steel to be able to compensate for the lesser such coefficient of the ceramic. However, the use of aluminum for the sleeve is further advantageous in that a protective coating of oxide forms on its surface and prevents oxidation or other chemical attack at substantially all temperatures under its melting point. This increases the useful life of the spark plug.

Because of the ductility of the aluminum there is established and maintained good surface contact areas between the sleeve and the insulating core and metal shell and consequently the thermal conductivity therebetween is increased. This increase in thermal conductivity permits use of longer insulating tips without lowering the heat rating of the plug. The use of such longer insulating tips increases the resistance to fouling and thus makes the plug more efficient.

Although only one embodiment of the invention is shown and described herein, it will be understood that this application is intended to cover such changes or modifications as come within the spirit of the invention or scope of the following claim.

I claim:

In a spark plug, a steel shell having a bore with an internal upwardly facing shoulder, a ceramic insulating core in said bore and having an external flange supported by said shoulder, said flange having a height approximately equal to one third of the depth of said bore above said shoulder, and a soft annealed aluminum sleeve loosely fitted over said core and loosely fitted within said bore to rest upon said flange, said sleeve initially having a length in excess of approximately two thirds of the depth of said bore above said shoulder and being compressed longitudinally to reduce said initial length to substantially twice the height of said flange and increase the initial thickness of the wall of said sleeve to take up the loose fit between said sleeve and said core and said sleeve and said shell to make a tight seal therebetween and so gall the metal of said sleeve with respect to both said core and said shell as to lock said core within said shell against slippage when said plug is subjected to internal pressure in actual usage.

GEORGE D. SUTER.

REFERENCES CITED

The following references are of record in the file of this patent:

UNITED STATES PATENTS

| Number | Name | Date |
|---|---|---|
| 972,560 | Honold | Oct. 11, 1910 |
| 1,084,543 | Furber | Jan. 13, 1914 |
| 1,142,369 | Schmidt | June 8, 1915 |
| 1,155,515 | Schmidt | Oct. 5, 1915 |
| 1,341,221 | Snodgrass | May 25, 1920 |
| 1,483,395 | Syme | Feb. 12, 1924 |
| 1,554,996 | Flynt | Sept. 29, 1925 |
| 1,968,314 | Rohde | July 31, 1934 |
| 2,020,965 | Rohde | Nov. 12, 1935 |
| 2,246,948 | McCarty et al. | June 24, 1941 |
| 2,308,968 | Gregory | Jan. 19, 1943 |
| 2,499,823 | Gogel | Mar. 7, 1950 |

FOREIGN PATENTS

| Number | Country | Date |
|---|---|---|
| 144,962 | England | June 24, 1920 |